United States Patent
Goodridge et al.

(10) Patent No.: US 10,144,678 B2
(45) Date of Patent: Dec. 4, 2018

(54) METHOD AND DEVICE FOR CONDUCTING COMMERCIAL BLASTING OPERATIONS

(71) Applicant: Orica International Pte Ltd, Singapore (SG)

(72) Inventors: Richard John Goodridge, Melbourne (AU); Steven Kotsonis, Melbourne (AU); Michael Horne, Campbell (AU)

(73) Assignee: ORICA INTERNATIONAL PTE LTD, Singapore (SG)

( * ) Notice: Subject to any disclaimer, the term of this patent is extended or adjusted under 35 U.S.C. 154(b) by 637 days.

(21) Appl. No.: 14/184,180

(22) Filed: Feb. 19, 2014

(65) Prior Publication Data

US 2014/0230679 A1    Aug. 21, 2014

Related U.S. Application Data

(60) Provisional application No. 61/767,005, filed on Feb. 20, 2013.

(51) Int. Cl.
| | |
|---|---|
| *C06C 5/06* | (2006.01) |
| *C06B 23/00* | (2006.01) |
| *C06B 47/14* | (2006.01) |
| *C06C 7/00* | (2006.01) |
| *C06C 7/02* | (2006.01) |
| *H01M 6/38* | (2006.01) |

(52) U.S. Cl.
CPC ............... *C06C 5/06* (2013.01); *C06B 23/00* (2013.01); *C06B 47/145* (2013.01); *C06C 7/00* (2013.01); *C06C 7/02* (2013.01); *H01M 6/38* (2013.01)

(58) Field of Classification Search
CPC ..................................................... H01M 6/38
See application file for complete search history.

(56) References Cited

U.S. PATENT DOCUMENTS

| | | | | | |
|---|---|---|---|---|---|
| 665,609 | A | * | 1/1901 | De Lamarre | H01M 2/0275 429/163 |
| 2,586,426 | A | * | 2/1952 | Grusel | B23Q 1/522 429/230 |
| 2,966,855 | A | * | 1/1961 | Barco | F42B 3/087 102/323 |
| 5,074,939 | A | * | 12/1991 | Sanders | C06B 47/145 149/2 |
| 5,099,763 | A | * | 3/1992 | Coursen | C06B 45/00 102/313 |
| 2009/0215629 | A1 | * | 8/2009 | Bevinakatti | A01N 25/30 504/358 |
| 2010/0331191 | A1 | * | 12/2010 | Bevinakatti | A01N 25/30 504/363 |

OTHER PUBLICATIONS

Journal of Applied Polymer Science, vol. 118, 1240-1243 (2010).*

* cited by examiner

*Primary Examiner* — Alexander Usyatinsky
(74) *Attorney, Agent, or Firm* — Birch, Stewart, Kolasch & Birch, LLP

(57) ABSTRACT

A method of generating electricity which comprises forming a galvanic cell comprising two electrodes in contact with an ionic conductor, wherein the ionic conductor comprises an explosive composition or is derived from an explosive composition.

22 Claims, 9 Drawing Sheets

Spiral wound cell

Bobbin cell

METHOD AND DEVICE FOR CONDUCTING COMMERCIAL BLASTING OPERATIONS

CROSS REFERENCE TO RELATED APPLICATIONS

This nonprovisional application claims the benefit of U.S. Provisional Application No. 61/767,005 filed on Feb. 20, 2013. The entire contents of the above application is hereby incorporated by reference.

FIELD OF THE INVENTION

The present invention relates to a method of production of electricity from explosive compositions, to devices embodying the method of the invention and to a method of conducting a commercial blasting operation relying on the method of the invention.

BACKGROUND TO THE INVENTION

The use of electrical/electronic devices is growing rapidly in commercial blasting operations. For example, some detonators now rely on Integrated circuits to provide functionality. Providing electrical power to such devices is therefore necessary. This could be achieved in, for example wireless initiation devices, using a built-in battery or charged capacitor but providing the devices "live" presents significant safety concerns since the device may itself contain an explosive (detonators include a small charge of explosive) or be positioned within or in proximity to an explosive during use. Addressing these concerns by specifically designed safety systems, such as multiple layers of control at the level of circuit design, is possible. However, this adds to design complexity and operation and, in turn, this has implications with respect to cost, efficiency and application. Furthermore, safe operation is compromised if the safety system itself fails.

The possible problems of providing an explosive-containing initiation device with a built-in power supply can be overcome by supplying the device in multi-component form, with the power supply containing component being distinct from any component containing explosive material. However, in such cases, the use of a built-in power supply, such as a battery or other charge storage device, can limit the shelf life of that component due to unintended (bleeding of) electrical discharge. This may occur by a number of mechanisms, including chemical and physical mechanisms. An embodiment of this invention seeks to avoid the problem of shelf life limitation that may be associated with on-board power supplies such as batteries.

Further, in a blasting operation it is sometimes desirable to leave electrical devices in a borehole for a long time. In such cases the use of an on-board battery may limit the sleep time of such devices, i.e. the period for which the device can be left in the bore hole before intended use. In an embodiment, the invention seeks to provide a power source that can easily be scaled to provide very long sleep times in the borehole.

Against this background it would be desirable to provide an alternative approach to providing electrical energy for electrical/electronic devices used in commercial blasting operations.

SUMMARY OF THE INVENTION

Accordingly, the present invention provides a method of generating electricity which comprises forming a galvanic cell comprising two electrodes in contact with an ionic conductor, wherein the ionic conductor comprises an explosive composition or is derived from an explosive composition.

In accordance with the present invention electricity is generated electrochemically by redox reactions involving a selected anode/cathode electrode pair and an ionic conductor. Broadly speaking this is a well-known methodology. However, unique to the present invention is the nature of the ionic conductor that is used. Thus, in accordance with the present invention the ionic conductor is an explosive composition or derived from an explosive composition.

The present invention also provides an electrical device for use in a (commercial) blasting operation, wherein electricity for powering the device is generated in accordance with the method of the invention. Herein, unless context dictates otherwise, the term "device" embraces a stand alone/discrete device, such as a detonator and a component or sub-system of a stand alone/discrete device. The component or sub-system is intended to provide some desired functionality, such as firing or communications functionality.

The present invention also provides a method of conducting a (commercial) blasting operation in which electricity required for operation of a device employed in the operation is generated in accordance with the method of the invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

BRIEF DESCRIPTION OF THE DRAWINGS

Embodiments of the present invention are illustrated with reference to the accompanying non-limiting drawings in which.

DETAILED DISCUSSION OF THE INVENTION

Figure 1:
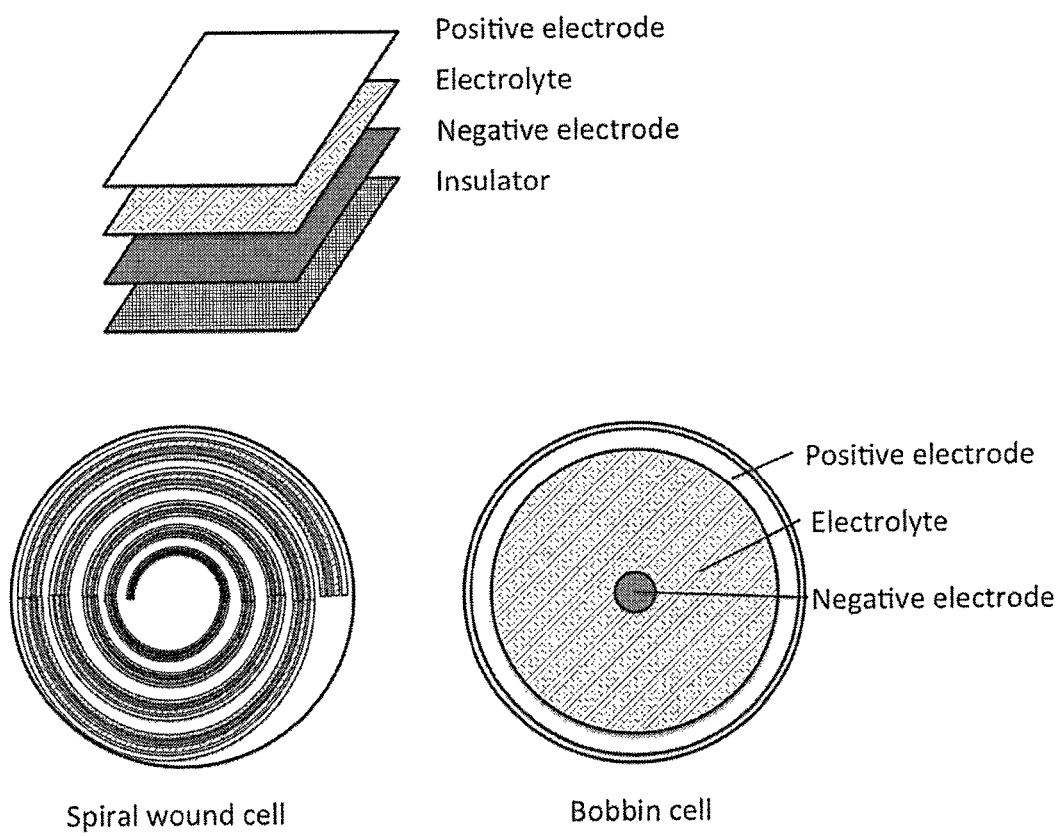
FIG. 1 is a schematic showing various battery cell designs.

The method of the present invention relies on formation of a galvanic (electrochemical) cell for electricity generation. One skilled in the art will appreciate that suitable selection of electrode materials and ionic conductor is relevant to the galvanic reactions required to generate an electrical current. The ionic conductor that is used may be an explosive composition that per se has the necessary characteristics to function in this context. Alternatively, some dopjng/modification/transformation of the explosive composition may be required in order for it to function as a suitable ionic conductor. In the latter cases, herein reference is made to the ionic conductor being derived from an explosive composition. All of these possibilities will be discussed in more detail below. It is necessary in accordance with the invention to provide an ionic conductor only between the electrodes.

The present invention uses a galvanic cell to generate electricity. In the cell two materials with different electron affinities are used as electrodes. Electrons flow from one electrode to the other when the cell is shorted through an external circuit. Within the cell the circuit is closed by movement of ions through the ionic conductor. In this way electrode reactions convert chemical energy to electrical energy. The ionic conductor includes an electrolyte dissolved in a suitable ionizing solvent such as water. Explosive compositions typically include ionic salts, such as ammonium nitrate, and these salts may be suitable electrolytes.

In an embodiment of the invention explosive composition being employed in a blasting operation is used to provide the ionic conductor for power generation in accordance with the present invention. For example, the explosive composition may be contained in a booster or it may be a bulk explosive that has been loaded in a blast hole. As will become apparent, only a small amount of explosive composition is required to function as, or be used to form, the ionic conductor. The remainder of the explosive composition retains its intended functionality. In this regard, the present invention relies on in situ electricity generation.

Generating in situ electricity means that the use of "live" devices (e.g., charged with sufficient electricity to achieve all functions of a firing sequence) may be avoided during transport and deployment operations. Thus devices embodying the present invention will be "inherently safe" until they have come into contact with the ionic conductor. The present invention will also overcome the relatively short shelf-life and potential hazard posed by the use of batteries, which are known to, on occasion, explode due to internal reactions. The present invention will enable the development of intrinsically-safe electric and/or electronic devices for use within or near explosive materials.

In an embodiment of the invention the explosive composition is an ionic conductor and is per se electrically conducting, typically having a conductivity of at least $0.1\ Sm^{-1}$ and preferably $10\ Sm^{-1}$. By way of example, the explosive composition may be a watergel, for example a watergel based on ammonium nitrate. In this case, once the galvanic electrode pair contact the watergel (and an electrical circuit closed by hard wiring the electrodes to each other), electricity generating reactions commence.

In another embodiment of the invention the explosive composition has low electrical conductivity $<0.0001\ Sm^{-1}$. This means that the explosive composition is essentially non-conducting. In this case the explosive composition may be doped/modified/transformed in order to increase its electrical conductivity to a practically useful level so that is may function as an ionic conductor in electricity generation. This could involve introducing an additive (an ionic conductor) into the explosive composition that per se provides ionic conductivity without otherwise altering the explosive composition. In this case the additive is responsible for ionic conduction between electrodes. For example, it may be possible to increase the electrical conductivity of an explosive composition by incorporating into the composition a suitable ionic salt, such as chloride salt, that does not otherwise, or unduly, interfere with the functionality of the composition as an explosive. Thus, the explosive composition may be doped with a suitable additive in order to provide or increase electrical conductivity.

In another embodiment the explosive composition is caused to undergo some physical or chemical transformation in order to provide an ionic conductor having the required electrical conductivity. This will be discussed further in relation to emulsion explosives as these are of particular interest in the context of the present invention.

Emulsion explosives are made by mixing an aqueous oxidizer salt phase with an immiscible organic fuel phase in the presence of a surfactant (emulsifier). Water-in-oil emulsions include droplets of the salt in a matrix of the fuel phase. A commonly used salt is ammonium nitrate, typically in combination with one or more other salts. By way of example, the emulsion is typically a 93:7 w/w water-in-oil emulsion, in which the salt phase is a super-saturated solution of ammonium nitrate. In such emulsions micron-sized droplets of the salt phase are completely isolated from each other by a thin film of the oil phase (and surfactant used in formation of the emulsion). This makes the emulsion electrically resistive. In this state, it is unlikely that any galvanic couple will generate power because ionic conduction through the emulsion will be very low, if occurring at all. However, the salt phase may per se suitably electrically conducting and in accordance with the present invention a demulsifier (an emulsion-breaking agent) is contacted with the emulsion thereby releasing the salt phase from the emulsion, at least in the immediate vicinity of (at least between) the electrodes. The salt phase is then able to function as an ionic conductor in a galvanic cell with the electrodes and thus electricity-generating reactions can commence. The commercially available surface active agent Petro® AG (Akzo Nobel, Ill.) may be used as a demulsifier in this regard. The demulsifier typically contains water and this will lead to dissolution and dilution of the salt phase. This also contributes to formation of the ionic conductor. In addition to breaking the emulsion, the demulsifier may itself also act as an ionic conductor to assist ionic conductivity within the galvanic cell. This function may be independent of the ionic conductor generated by breaking of the emulsion, although there may be some form of combined (additive or possibly synergistic) effect in terms of ionic conductivity as between the two ionic conductors. In general terms in this embodiment the explosive composition is an emulsion explosive comprising droplets comprising an oxidizer salt in a matrix of a fuel phase, and wherein a demulsifier is contacted with emulsion explosive between the electrodes in order to produce an ionic conductor between the electrodes.

When using an emulsion explosive composition, one possible complication may be that electrodes may be fouled by the oil-phase, or other component of the emulsion. This phenomenon may vary between demulsifiers and/or electrode materials. With this problem in mind it may be desirable to coat or modify at least a portion of the electrode surface in order to repel oil, or in some other way reduce resultant passivation, either by oil or other substance.

In another embodiment the explosive composition comprises an electrolyte such as ammonium nitrate and the ionic conductor is formed by dissolution of the electrolyte in a suitable solvent. The solvent may be any suitable polar solvent, typically water. For example, the explosive composition may be made up of ammonium nitrate prill distributed in a fuel oil matrix (so-called ANFO). In this case the explosive per se does not exhibit suitable electrical conductivity to be useful in the present invention. Some modification/transformation is therefore required in order to provide an ionic conductor having electrical conductivity at a practically useful level. One way that this may be done is to form an aqueous solution of the salt using water as solvent. Thus, in this case, formation of the ionic conductor involves dissolution in water of some ammonium nitrate prill. The ionic conductor should be formed at least in the vicinity (at least between) the electrodes. It may be possible to form a suitably conducting ionic conductor by dissolving prill in another solvent, but water is believed to be the most convenient solvent to use.

Selecting the best electrode materials for use based on their electrochemical activities with respect to a particular ionic conductor is necessary. It is believed that one skilled in the art would be able to do this based on knowledge of electrochemistry and by routine experimentation. However, predicting the electrochemical behaviour of any galvanic couple in the context of the present invention may be complicated by at least three possible interferences.

Firstly, local cells may form leading to corrosion of electrodes. Corrosion of the electrodes by the formation of local cells can occur when both half-reactions (reduction and oxidation) take place on the same electrode and no current flows in the external circuit. In this case of a nitrate-containing ionic conductor for example, the concurrent reduction of nitrate ions and oxidation of the electrode material on the same electrode will lead to corrosion. For example, spot tests of various metals in 33% ammonium nitrate solutions have shown that local cells can form, particularly on more reactive metals such as zinc and pure iron. However, an emulsion contains a number of additional compounds and the impact these compounds have on the rates of the two reactions which comprise a local cell may be hard to determine. Consequently, it is not wise to select electrode materials on the basis of tests conducted in pure solutions alone. Control of this process relies on identifying materials that either catalyse or inhibit the reduction of nitrate, and using one of each in the galvanic couple. Given this knowledge, one skilled in the art would be able to optimise selection of electrode materials for a given ionic conductor system.

Secondly, the electrochemistry of the ionic conductor may be complex. Commonly the ionic conductor will comprise ammonium nitrate as this is commonly used in explosive formulations. In this case, two likely electrochemical reactions that would lead to energy generation from this type of emulsion are reduction of nitrate ions at the positive electrode, and oxidation of electrode material (preferably a metal) at the negative electrode. The reduction of nitrate is a complex reaction. It involves from one to eight electrons, depending on pH, nitrate concentration, catalytic processes and other species present, including the reduction products of nitrate itself These latter products can catalyse or inhibit further nitrate reduction. Moreover, the demulsifier itself may also contain electroactive species that could contribute to, or dominate the electrochemistry. The only realistic way to handle this complexity is by directly observing the activities of various electrode combinations and carefully considering not just instantaneous energy generation, but also how energy generation varies with time.

Thirdly, conductivity issues may arise due to passivation of the electrodes by species present in the explosive composition. For example, when the explosive composition is an emulsion, the fuel phase, surfactant and/or other additives in the emulsion may coat one or both electrode thereby impeding conductivity. It has also been observed that electrochemical reactions are particularly sensitive to certain compounds, such as adsorbates. A complex system, such as an emulsion explosive composition, may exhibit profoundly different electrochemical behaviour than would an aqueous solution containing the same electrolyte species. Experimentation may therefore be required in order to fully assess the operability/usefulness of a particular combination of electrodes and ionic conductor.

Noting these considerations it is believed that one skilled in the art would nevertheless be able to determine suitable electrode materials for use with a given ionic conductor. By way of example, when the ionic conductor comprises ammonium nitrate, possible combinations of electrodes include steel alloy and graphite, titanium and graphite, aluminium and graphite, iron and graphite and iron and titanium, nickel and titanium, nickel and graphite, steel alloy and activated carbon, zinc and activated carbon and zinc and graphite. Here reference is made to using carbon as electrode material with the carbon being in the form of graphite or activated carbon. It may be possible also to make use of graphene, or other carbon structural form as electrode material. It should be noted that in the case of generating electricity from explosive emulsions (even when demulsified), some combinations will be incompatible due to potential reactivity resulting in undesired events. It is thus preferable that all components of this electrical generation system are inherently unreactive, or have been rendered unreactive by methods known to one skilled in the art, with components of the explosive emulsion and/or its entirety.

The positive electrode should have a large electrochemically accessible surface area (i.e., surface area for contacting the ionic conductor), for example up to, or exceeding 2000 $m^2/g$ and retain acceptable activity throughout the discharge. Equally, the negative electrode must also have sufficient surface area and retain high activity throughout the discharge. A variety of different cell configurations may be employed, for example including planar arrangements, spiral wound cells and bobbin cells, as illustrated in FIG. 1. Typically, the volume of ionic conductor in contact with the electrodes will be between 5 ml and 1000 ml, however, can be any volume sufficient to provide the desired electrochemical energy.

The electrodes may be mounted on a suitable housing that is adapted to allow the electrodes to be immersed in an explosive composition during use. The present invention extends to a device comprising such an arrangement. The housing may include means that allow it to be connected or fitted to a contained explosive charge as might be required, such as to a booster shell. The housing may also include means that allow electrical connection to the electrodes. Lead wires may therefore be provided.

The invention may be used to provide electrical power to a device used for initiating an explosive. The device may be an electric or electronic detonator or a wireless electronic booster or other device intended to initiate a explosive. For example, the device may achieve initiation of an explosive by irradiation of explosive with a suitable wavelength of light/light source, such as a laser.

In the device the electrodes may be electrically coupled or not depending upon the intended activation mechanism for electricity generation. The device may also include one or more additional components such as charge storage devices, and components that provide specific functionality. The present invention may be used as a source of electrical energy to provide power to an electric or electronic detonator to control operation thereof. In the case of an electric detonator this may simply be to fire the detonator. In electronic blasting systems the present invention may be used to provide electrical power to support a variety of other functionalities. For example, in electronic blasting systems, the invention may be applied to provide power to a component or sub-system for (two-way) communication. Here it is envisaged that the invention may be used to provide power to allow electronic detonators within a blast-hole to communicate with control equipment. In the same way the invention may be employed to power a communications component or sub-system of a wireless electronic booster so that the booster can communicate with control equipment. Thus, this aspect of the invention may be particularly useful in the context of a wireless initiation system. For a wireless network the cell voltage required to run most commercially available microcontrollers is between 3.1 and 4V. This may determine a number of design elements, such as whether it is better to connect several cells in series, or design and build an electronic booster circuit, or a combination of both.

The invention may be used to supply all of the electrical energy necessary to power a device, component or sub-system in order to achieve desired functionality. However, the invention may also be applied to supply only a part of the electrical energy so required with further energy coming from another source.

In an embodiment of the invention an explosive device may be provided with a built-in power source (e.g. a battery) that can supply sufficient electrical energy to power required functionality that is not directly related to, or sufficient for, initiation of the device. In this case electrical power for initiation may be generated in accordance with the present invention when the device is used in the field. Desirably, the built-in power source is incapable of supplying sufficient electrical power to cause initiation of the device. This has safety advantages because until the device is being used in the field it is inherently safe, even if there is some malfunction in the device whereby an initiation/firing circuit receives power from the built-in power source. By way of example, a wireless booster may be provided with a low-power battery to drive communications and/or sensor functionality, with the battery output being inadequate to fire the booster. The booster is therefore inherently safe, for example when transported and stored. The power for firing the booster may be generated in accordance with the present invention when the booster is used in the field. Prior to such use inadvertent initiation is not possible.

In general the expression "wireless electronic booster" encompasses a device comprising an explosive charge to be actuated by actuation of an associated detonator. The booster may be associated with or comprise a detonator, most preferably an electronic detonator (typically comprising at least a detonator shell and a base charge). Further examples of wireless electronic boosters are described in international patent publication WO 2007/124539 published Nov. 8, 2007, which is incorporated herein by reference.

The present invention may also be an enabling technology for a whole series of ancillary (function specific) devices. This includes, for example, telemetry sensors to indicate blast-hole conditions (e.g. to detect elevated temperatures in reactive ground applications or to detect water ingress in holes for detonation fume control) or in fact any devices, including potentially those whose power usage is higher than that delivered by batteries.

It is also desirable to control when electricity generation begins and that rate at which power is delivered for storage. This in turn will depend upon the context of use, associated operating parameters and safety considerations. For example, it may be desired for a device to become active/live only after a predetermined period of time, after which the device or devices has/have been located at a desired position. The reaction kinetics of the electricity-generating reactions will be relevant here, although other control mechanisms are possible, including stimulus-response mechanisms.

When the ionic conductor is the explosive composition per se this control may be achieved by controlling when electrically pre-connected electrodes are contacted with ionic conductor and/or when electrically unconnected electrodes in contact with ionic conductor are connected. In this case one or both electrodes may be coated with a passivating material that is gradually consumed when the electrode(s) contact the ionic conductor thereby causing the electrode(s) to contact the ionic conductor directly with a galvanic cell then being created. Burst-disc technology may also be used to release/expose the electrodes as required under blast-hole pressures. The idea of using a burst disk is to limit exposure of the electrodes until the device is under some hydrostatic pressure, for example when placed in an explosive emulsion filled shot-hole. Pressure alone may trigger ingress of the emulsion into the cell, so the device is totally inactive until the disk has burst. Another example that may provide a means to allow generation of electrical power following deployment of the power source includes designing the system for suitable capillary action movement of ionic conductor over the electrodes.

When some form of manipulation/transformation of the explosive composition is required in order to produce the ionic conductor, the rate at which this is done may be used for control purposes. When it is necessary to break an emulsion explosive composition to yield a discrete aqueous salt phase that will function as ionic conductor, control may be achieved based on when a demulsifier is contacted with the emulsion and/or the reaction kinetics associated that contact. In this case it may be appropriate to introduce the demulsifier in a controlled fashion at the electrodes so that a galvanic cell is activated at the correct time to enable electricity generation to begin. This should be done without compromising the remainder of the emulsion explosive.

By way of example, the demulsifier may be provided as a coating on one or (usually) both electrodes with the demulsifier acting on emulsion between the electrodes when the electrodes and emulsion come into contact. Such things as the reaction kinetics (based on the intended operating environment) and electrode spacing/volume of emulsion between the electrodes will influence when that portion of emulsion between the electrodes is transformed into ionic conductor and thus when electricity generation begins.

In another embodiment burst-disc technology may be used to release demulsifier or expose the electrodes as required under blast-hole pressures. Equally by example, the demulsifier can be microencapsulated within particles designed to release the agent under blast-hole conditions.

Similarly, when formation of ionic conductor involves dissolution of prill, control may be achieved based on when solvent is contacted with the emulsion and/or the dissolution kinetics. Burst-disc technology may be used to release solvent or expose the electrodes as required under blast-hole pressures. A myriad of other mechanisms, preferably for aqueous, solvent containment, exist that could be applied to this purpose.

It will be appreciated that in these various embodiments rates of reaction and dissolution may vary depending upon prevailing conditions of use, such as temperature, pressure and concentration of reagents. These variables may be taken into account when implementing the present invention.

In the cases where the explosive composition must be modified/transformed in some way in order for it to function as an ionic conductor, when the electrodes are electrically coupled may also be a control option.

Typically, it is desired that the methodology of the present invention generates a steady (and relatively low) level of electricity, which is expected to provide safety advantages whilst maximizing the electricity-generating life-time or practically useful shelf-time. For example, typical electricity generation will range from 0.1 mA to 10 mA, operating at 1V to 5V. This steady electrical generation may be used to power an energy-storage device (for example a capacitor or super-capacitor), or less preferably directly power a coupled device. Discharge of the energy storage device can then be used as required, for example to control a firing circuit or other specific electronics. In this regard the charging efficiency (and cost) of the energy storage device will need to be taken into account. Super-capacitors are known to offer high energy density and rapid discharge rates required to enable driving a firing circuit. However, their use may be limited by their background discharge rates as this might reduce system sleep-times.

If the methodology of the present invention is being employed to generate electricity for firing an initiating system, the main reason for requiring low-level electrical power generation for storage is to ensure that at no time is sufficient electricity generated directly from the galvanic reactions to fire the system. This will also allow the seamless overlay of existing control circuitry to ensure safe and effective operation of associated electronics.

The design and construction of the electricity-generating cell may also be optimised for energy production. Parameters to be optimised include cell materials and geometry, electrode materials, electrode surface areas, electrode geometry and arrangement of the electrodes within the cell. It may be necessary to employ several galvanic cells in series to ensure adequate voltages are generated. In this case the overall series resistance will need to be taken into account.

This design and construction may also involve measuring the maximum power point and the optimum impedance of the cell based on voltage-current curves. Matching the cell impedance is a design goal for achieving the most cost-effective final design. The power generated by the cell will usually be measured across different resistances a number of times to determine the maximum power point, reliability and the reproducibility of the cell discharge. These measurements will also determine some fundamental characteristics of the cell, including hours to full discharge, total capacity, power-time profile and possible modes of failure. Changes to cell design and electrode geometry may be necessary to optimise power output. During the design phase the temperature of the electrodes may also be measured periodically to check whether the current flowing leads to any heat generation in the cell.

The design and choice of materials of construction may also be influenced by the robustness required taking into account intended context of use. Cost may also have an impact on design and materials selection.

Another design variable is inter-electrode spacing and in turn this will impact on the overall size of the cell and the amount of ionic conductor used. Here the equivalent series resistance of the galvanic cell will go up as the inter-electrode spacing goes up. This will also enable the number of electrodes in series to be altered to boost the overall voltage available if desired. If the negative electrode does passivate during reaction, different electrode materials may be used to test their effectiveness. Surface treatment of the electrode will be kept to a minimum initially to avoid the need for a costly pre-treatment step.

Embodiments of the present invention are illustrated with reference to the following non-limiting examples.

EXAMPLE 1

Calculation

Assuming a galvanic couple behaves ideally (that is, that all electrochemical reactions generate currents that flow in the external circuit), Faraday's laws predict that the amount of charge in Coulombs, Q, which will be generated because of an electrochemical reaction, is:

$$Q = nm/AF \quad (1)$$

where n is the number of electrons involved in the electrochemical reaction, m is the mass of reactant consumed in grams, A is the atomic (or molecular) mass of the reactant and F is Faraday's constant.

For example, if 10 grams of iron is consumed by oxidation to $Fe^{2+}$, then the number of Coulombs generated by this reaction is:

$$Q = 2 \times 10/55.85 \times 96485 = 34,551 \text{ Coulombs.}$$

The energy generated, J, (in joules) is simply Q multiplied by the voltage of the galvanic couple, E:

$$J = QE \quad (2)$$

Or, by combining (1) and (2):

$$J = nm/AFE \quad (3)$$

Using the example above and assuming the galvanic couple generates a voltage of 200 mV (a conservative figure for this work), then the energy generated by the electrochemical reaction is:

$$0.2 \times 34,551 = 6,910 \text{ J}$$

For comparison, an alkaline longlife AA battery stores approximately 9,400 J. The power is simply the instantaneous rate at which energy is generated:

$$P = dQ/dt \, E (4) \text{ which is more recognisable as:}$$

$$P = iE \quad (5)$$

The power output cannot be determined unless the rate at which the iron was consumed is known. However, this rate is one of the fundamental experimental variables that is routinely measured: the electrochemical current, i.

EXAMPLE 2

Materials and Methods
Ammonium Nitrate Emulsion Formulations

A range of ammonium nitrate emulsions were used to determine the effect that varying formulations may have on the generation of potential in a graphite/iron galvanic cell.

ANE Coal V2P is a standard ammonium nitrate emulsion used for the manufacture of a number of commercial bulk explosives. Its composition is set out in Table 1 below.

TABLE 1

| Raw Material | % In Formulation |
| --- | --- |
| Ammonium Nitrate | 69.45 |
| Water | 22.92 |
| Acetic Acid (75%) | 0.17 |
| Thiourea | 0.05 |
| Soda Ash | 0.02 |
| E25/66T | 1.04 |
| Paraffin Oil | 4.66 |
| Canola Oil | 1.70 |

E25/66T is a surface active agent, used an emulsifier. Urea is used as an inhibiting agent to ensure compatibility of emulsion explosives in reactive ground conditions.

To investigate the effect that urea may have on the generation of potential in the iron/graphite galvanic cell, the inhibited emulsion formulation—ANE 230 was investigated, see Table 2. Zonyl is a fluorosurfactant used in some products, predominately underground, as a bubble stabiliser to optimise bubble retention and distribution during sensitization of the emulsion with gas bubbles.

TABLE 2

| Raw Material | % In Formulation |
| --- | --- |
| Ammonium Nitrate | 71.15 |
| Water | 20.38 |
| Urea | 1.64 |
| Acetic Acid (75%) | 0.17 |
| Thiourea | 0.14 |
| Soda Ash | 0.02 |
| E25/66T | 2.34 |
| Paraffin Oil | 1.81 |
| Canola Oil | 2.34 |
| Zonyl | 0.01 |

A high ammonium nitrate formulation, ANE Extra, was investigated to determine the effect that an increased ammonium nitrate content emulsion will have on the generation of potential in the graphite/iron galvanic cell, see Table 3.

TABLE 3

| Raw Material | % In Formulation |
| --- | --- |
| Ammonium Nitrate | 76.78 |
| Water | 15.49 |
| Acetic Acid (75%) | 0.17 |
| Thiourea | 0.05 |
| Soda Ash | 0.02 |
| E25/66T | 1.80 |
| Distillate | 5.70 |

A dummy emulsion was formulated for ease of transport and use in the laboratory, complying with the various codes of transport and security surrounding ammonium nitrate; see Table 4.

TABLE 4

| Raw Material | % In Formulation |
| --- | --- |
| Ammonium Nitrate | 32.55 |
| Ammonium Sulphate | 15.81 |
| Urea | 1.63 |
| Sodium Acetate | 0.09 |
| Acetic Acid (75%) | 0.17 |
| Thioruea | 0.09 |
| Water | 42.66 |
| E25/66T | 2.52 |
| Canola Oil | 2.52 |
| YK-D130 | 1.95 |
| Lodyne S300 | 0.01 |

YK-D130 and Lodyne 300 are not expected to participate in the electrical generation reaction. YK-D130 is a hydrocarbon that will act as fuel during combustion/detonation. Lodyne S300 is a surface active agent with desired wetting properties.

Galvanic Cell: Experimental Set Up

Immediately prior to use, the iron and graphite electrodes of 3 mm diameter and 100 mm long were abraded with fine silicon carbide paper, washed with distilled water and then dried.

A DATAQ data logger, software and hardware was used to measure and record the potential generated by the galvanic cell. To mitigate possible compatibility issues, the copper alligator clips which connected the electrodes to the data logger were replaced with nickel plated alligator clips.

The emulsion being tested was syringed into a 40 mL capacity glass phial (see Table 5). The clean dry electrodes were then placed in the emulsion and connected to the DATAQ data logger and the recording of potential initiated. Petro® AG special liquid was then added to the emulsion at a dose rate of ~3% w/w (see Table 5). A control of 100% Petro® AG special liquid (demulsifier) was added to the glass phial. For consistency, the circuit of the Petro® AG control phial was connected at the same time Petro® AG was added to the emulsion samples.

TABLE 5

| Data Channel | Emulsion | Emulsion Mass (g) | Petro® AG Mass (g) |
| --- | --- | --- | --- |
| 1 | Dummy ANE | 30.02 | 1.03 |
| 2 | Dummy ANE | 30.72 | 1.06 |
| 3 | Dummy ANE | 29.59 | 1.00 |
| 1 | ANE Extra | 29.92 | 1.10 |
| 2 | ANE Coal V2P | 30.90 | 1.07 |
| 3 | ANE 230 | 30.43 | 1.03 |
| 4 | — | — | 29.90 |

Experiments were set up between 3 pm and 4 pm on two consecutive days of similar ambient environmental conditions; temperature, etc. Measurements were made over a ~24 hour period with an effective sampling rate of ~9.3/minute.

For all samples, the negative terminal was attached to the graphite electrode and the positive terminal was attached to the iron electrode.

Results and Discussion

Figure 2:
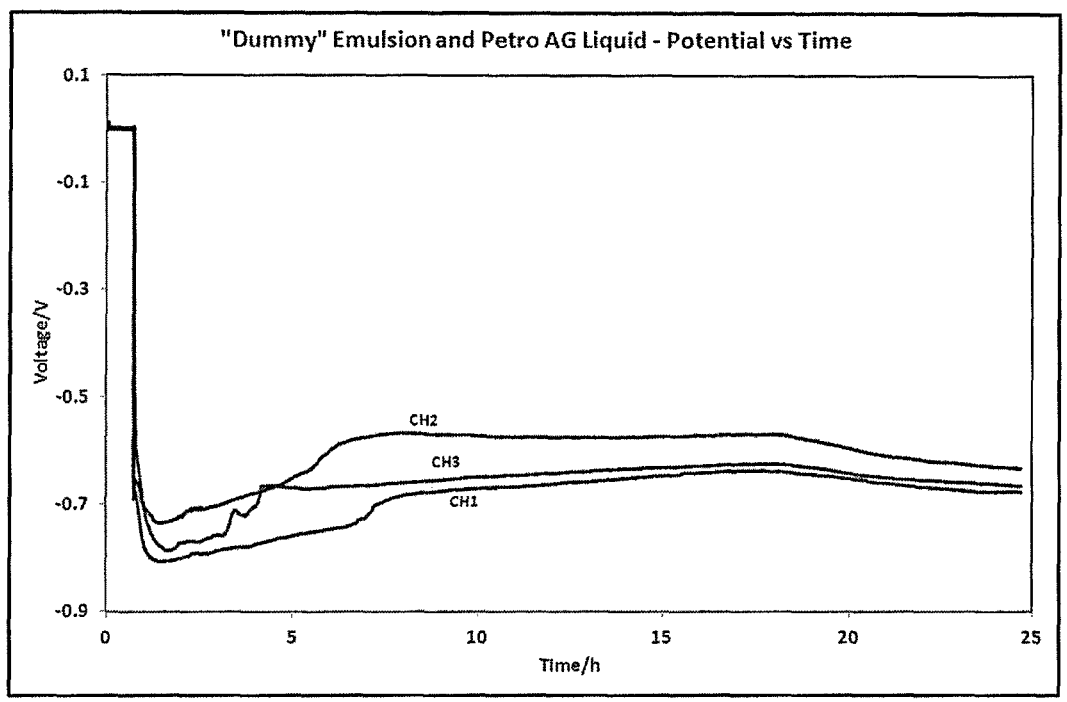
FIG. 2 is a plot of recorded potential of a "dummy" ammonium nitrate/ammonium sulphate emulsion, as referred to in the examples.

The potential generated by the galvanic cell containing the iron/graphite electrode couple with the dummy emulsion and 3% Petro® AG special liquid is shown in FIG. 2. No current is generated until the addition of Petro® AG special liquid, at which point the maximum potential is generated almost instantly. Following this initial potential generated, a decrease in the absolute potential is observed to an approximate steady state for each sample, after ~4-7 hours. Some slight variation follows, at the ~18 hour mark. This can be attributed to fluctuations in ambient temperatures affecting the rate of reaction, similar fluctuations are observed at similar times in the second trial, see FIG. 3.

Figure 3:
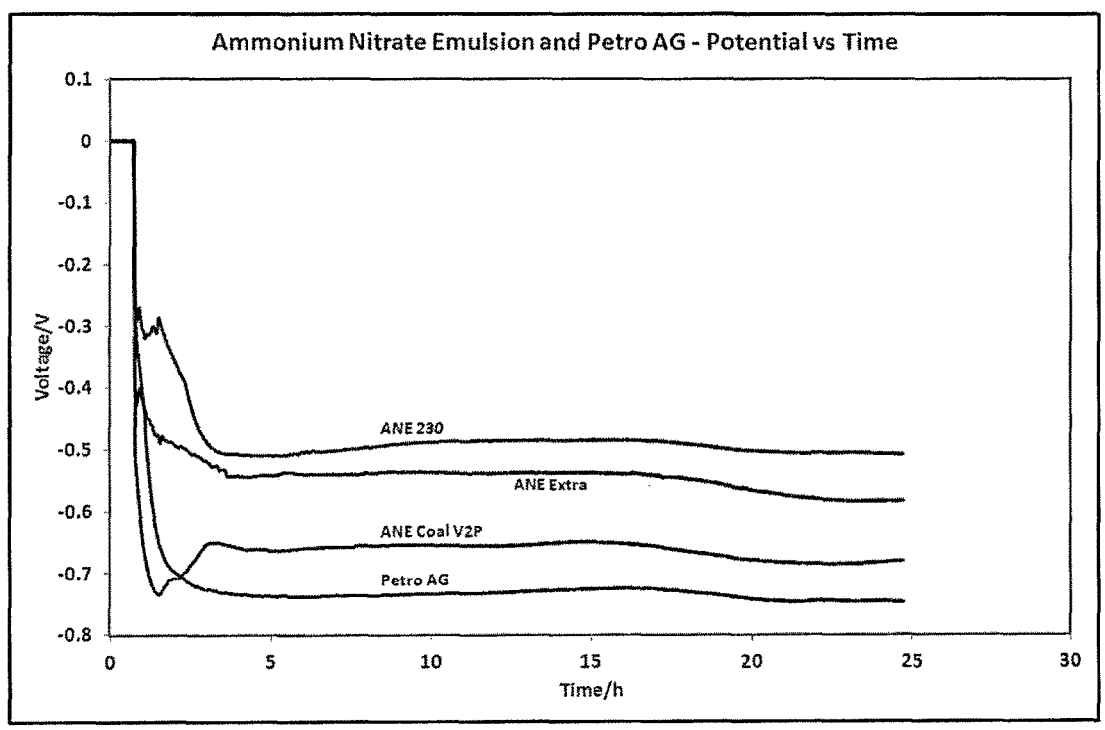
FIG. 3 is a plot of recorded potential of three ammonium nitrate emulsions; as referred to in the examples.

The potential generated using three ammonium nitrate emulsions; ANE Extra, ANE Coal V2P, and ANE 230, under similar conditions to the dummy emulsion, and (100%) Petro® AG special liquid are shown in FIG. 3. Similar to the dummy emulsions, addition of Petro® AG resulted in an immediate response and generation of potential. However, the initial response is not as drastic for the ANE 230 and ANE Extra samples. The maximum absolute potential is generated after the initial activity when a steady state is achieved after ~4 hours.

The Coal V2P sample more closely resembles the dummy emulsions with a peak absolute potential occurring at ~45 minutes after Petro® AG addition. The recurring theme of all emulsion samples investigated suggests a bimodal mechanism whereby the addition of Petro® AG solution results in an immediate potential generation, which slowly equilibrates to a "steady state" reaction after ~4-7 hours. The mechanism for the initial potential generation seems to differ with the lower ammonium nitrate containing samples generating a peak absolute potential in the initial mechanism; when compared to the higher ammonium nitrate containing samples, where a gradual increase in absolute potential generation until steady state is observed. Although the slight variation between ANE Coal V2P and ANE 230, 69.45% ammonium nitrate to 71.15% ammonium nitrate, respectively, may not be significant enough to explain the observed difference.

The 100% Petro® AG special liquid sample generated a peak absolute potential at a slower rate than the "low" ammonium nitrate emulsions, Dummy and Coal V2P. It is evident that to the generation of potential with the iron/graphite electrode couple is not reliant on the presence of nitrates from the emulsion, but can be generated by the presence of Petro® AG liquid only. Unsurprisingly, the mode of potential generation in the Petro® AG liquid sample is simpler than the emulsion/Petro® AG samples, with only a single mechanism of potential generation, suggested by the uniform increase in absolute potential up to the steady state. Similar to the emulsion/Petro® AG samples, the neat Petro® AG sample displayed fluctuations in potential generated, consistent with the warming of lab conditions due to the time of day.

A small quantity of bubbles were observed forming around the surface of the graphite electrode, this is likely the formation of nitrous oxides as nitrates are reduced. The production of gaseous by-products should be considered when applying the technology, as hydrostatic pressure at the bottom of a column may result in equilibrium conditions which reduce the observed rate and magnitude of redox reactions at STP.

The data generated in these experiments is a function of the distances of the electrodes from one another and the diffusion of charged species through the solution, as is relevant for the generation of potential. As the electrodes are further removed from one another, the rate of reaction will become more dependent on the transfer of charged species through ionic conductor. The experimental set up did not strictly control the proximity of the electrodes, particularly towards the bottom of the glass phial. Given the small size of the cell and the highly conductive solutions used, it is possible that slight variations in electrode distances did not play a large role in the quantitative data generated. Although the significant variation in the data generated across the three identical cells in FIG. 2 is possibly the result of this phenomenon.

Conclusions

The use of a graphite/iron electrode couple in a dummy ammonium nitrate emulsion/Petro® AG liquid mixture generated a reliable potential, and this effect was validated on several ammonium nitrate emulsions.

The mechanism of potential generation is likely bimodal, with observed variations in the initial potential generation mechanism in different formulations, prior to an apparent steady state about 4-7 hours after Petro® AG liquid addition.

The magnitude of potential generation is temperature dependant, coinciding with the temperature dependence on the rate of reaction. It is also likely that the generation of gas at the graphite electrode adds a pressure dependence on the rate of reaction and magnitude of potential generation.

EXAMPLE 3

In this example a simple method for testing a number of galvanic couples in an emulsion is described. Two experiments were run using this method, in which the voltages generated by ten couples across a 1 megaohm ($10^6 \Omega$) resistor were recorded. These experiments ran for between 130 and 160 h and aimed to test two main variables:
1. whether any of the couples would be capable of generating power from within the an (unaltered) emulsion
2. whether certain surfactants for 'breaking' the emulsion would assist in power generation.

The Nature of the Emulsion

The emulsion employed is a 90:10 w/w water-in-oil microemulsion, in which the aqueous phase is a supersaturated solution of ammonium nitrate. Importantly for this work, the micron-sized droplets of the water phase are completely isolated from each other by thin films of oil, surfactant and other additives. This makes the emulsion electrically resistive. In this state, it is unlikely that any galvanic couple will generate power, because ionic conduction through the emulsion will be vanishingly small. A surfactant that was known to be particularly effective for breaking this emulsion was also employed.

In this experiment for safety purposes a non-detonating 'dummy' emulsion of ammonium nitrate/ammonium sulphate was used. This 'dummy' emulsion contains 44% w/w ammonium nitrate in the aqueous phase, the amount that must be exceeded for detonation to occur within a confined vessel. The formulation of this 'dummy' emulsion was approximately 44% ammonium nitrate and 16% ammonium sulphate in the aqueous phase. For the purposes of this work, it was that considered this emulsion would behave similarly to a 'real' emulsion explosive. This is because the dilution of the nitrate concentration due to the addition of sulphate is not significant for the electrochemistry. In addition, the presence of the sulphate ion is believed to be irrelevant, because it is not involved in the anticipated electrochemical reactions.

Also for safety reasons the experimental apparatus was operated inside a fume hood to minimise the possibility of reaction products, such as oxides of nitrogen, contaminating the laboratory.

Figure 4:
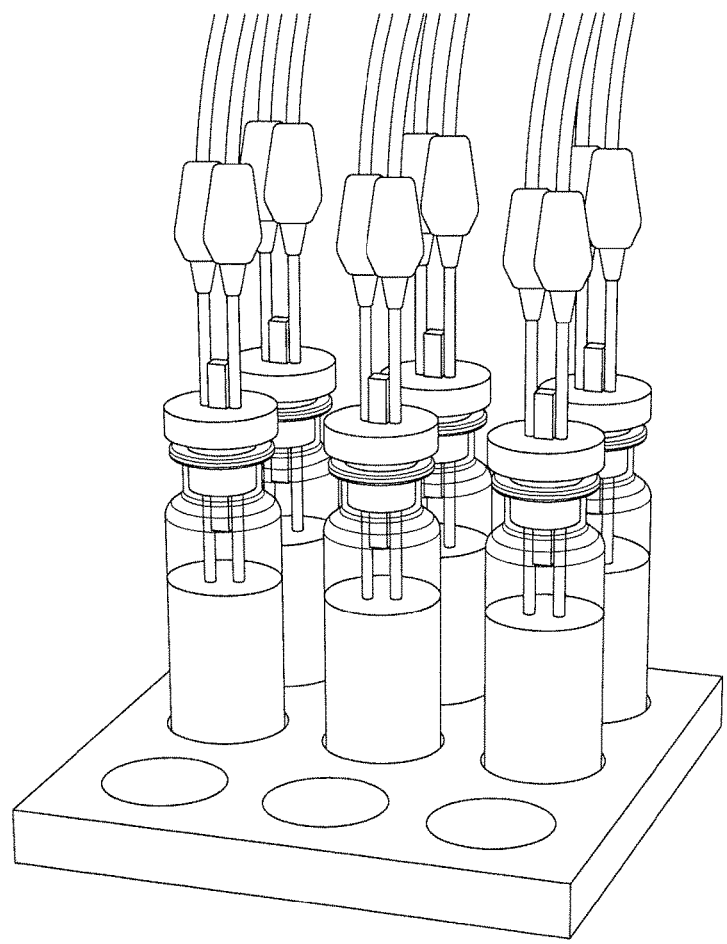
FIG. 4 shows an experimental set-up used to assess emulsion electricity generation by a Galvanic cell.

The cells used—glass phials with 40 ml capacity—were mounted in a custom-built polyethylene base for stability. Loose-fitting caps machined from Delrin, into which two 3-mm holes had been bored for locating the electrodes, were used to minimise contamination from dust and debris (see FIG. 4 for the experimental arrangement).

The electrodes were made from 3-mm diameter rods of nickel alloy type 201 (Ni), stainless steel type 316 L (SS), aluminium alloy type 4043 A (Al), titanium (Ti), tool steel type A2 (TS), iron (Fe) and graphite (Gr). Typical compositions of the alloys are given below.

Aluminium Alloy Type 4043 A

| Element | Si | Fe | Cu | Mn | Mg | Zn | Ti |
|---|---|---|---|---|---|---|---|
| Weight % | 4.5-6.0 | 0.80 | 0.30 | 0.05 | 0.05 | 0.10 | 0.20 |

Nickel Alloy Type 201

| Element | Ni | Cu | Fe | Mn | C | Si | S |
|---|---|---|---|---|---|---|---|
| Weight % | 99.0 min | 0.25 max | 0.40 max | 0.35 max | 0.02 max | 0.35 max | 0.01 max |

Stainless Steel Type 316 L

| Element | C | Cr | Ni | Mo | Mn | Si | P |
|---|---|---|---|---|---|---|---|
| Weight % | <0.03 | 16-18.5 | 10-14 | 2-3 | <2 | <1 | 0.05 |

Tool Steel Type A2

| Element | C | Mn | Cr | Ni | Mo | V |
|---|---|---|---|---|---|---|
| Weight % | 1 | 1 | 5 | 0.3 | 1 | 0.15-0.5 |

A fixed amount of emulsion (30±1 g) was placed into each cell at the start of the experiment. The selected electrode pairs were abraded on clean silicon carbide paper, washed and dried before being placed into the cells through holes drilled into the Delrin lids. Pairs of leads terminated with alligator clips provided electrical connection to the data logger. The surfactant used for 'breaking' the emulsion was Petro® AG: a commercially available liquid containing predominantly sodium alkylnaphthalenesulfonate. It was added directly to the surface of the emulsion at a concentration of 3% w/w (approximately 1 g per cell). Voltages generated by the electrode pairs were recorded by a data logger from DATAQ (Ohio, US) controlled using DATAQ's proprietary software WinDAQ. The data logger allowed up to eight differential-input channels to be recorded simultaneously. The input impedance of the data logger was 1 MΩ. Text files recovered from the logger were reduced in size using a method that did not bias the data and the results were plotted using Microsoft Excel.

In a separate experiment, the 'breaking' of the emulsion by the surfactant in a single cell was recorded by time-lapse photography. The experimental conditions were identical to those used in the energy generation experiments. A Logitech HD Pro C910 webcam controlled by Flix software from Nimisis (<http://www.nimisis.com/projects/flix.php>) was used to take images of the emulsion in the cell every 10 min for 72 h. The surfactant was added after the first hour. The resulting images were converted into a single animated gif image using Gimp software (<http://www.gimp.org/>).

Results

Figure 5:
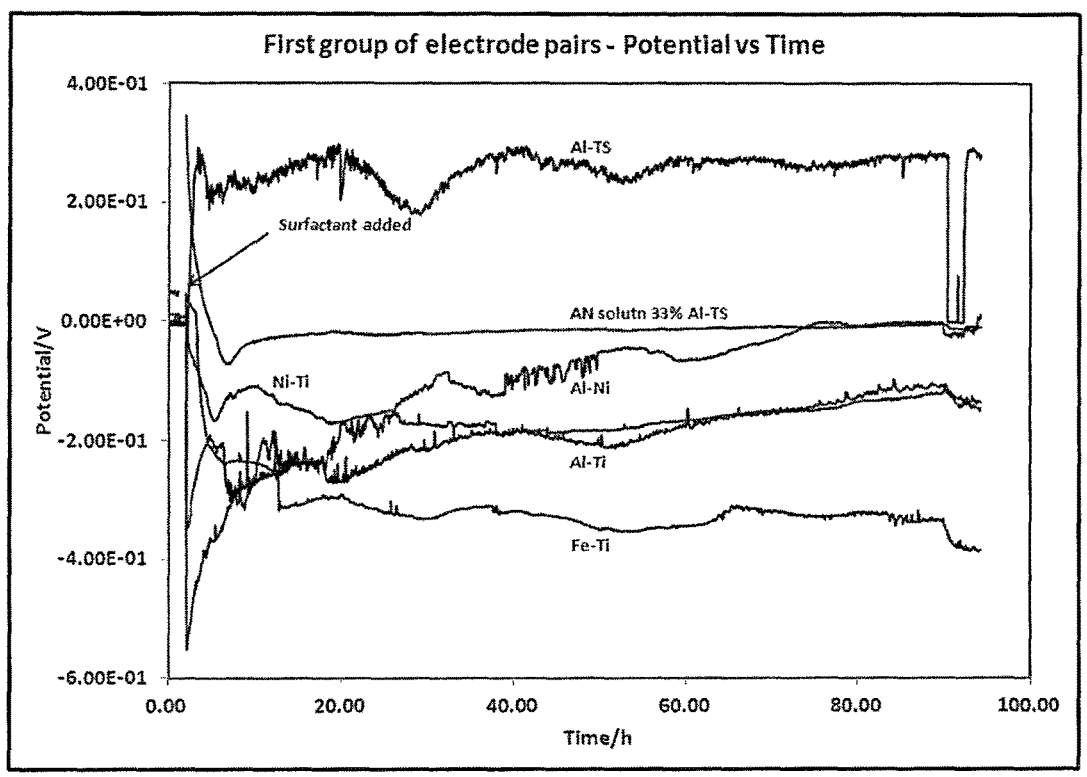
FIG. 5 is a plot of Voltage-time data recorded for six different conductor pairs, as referred to in the examples.
Figure 6:
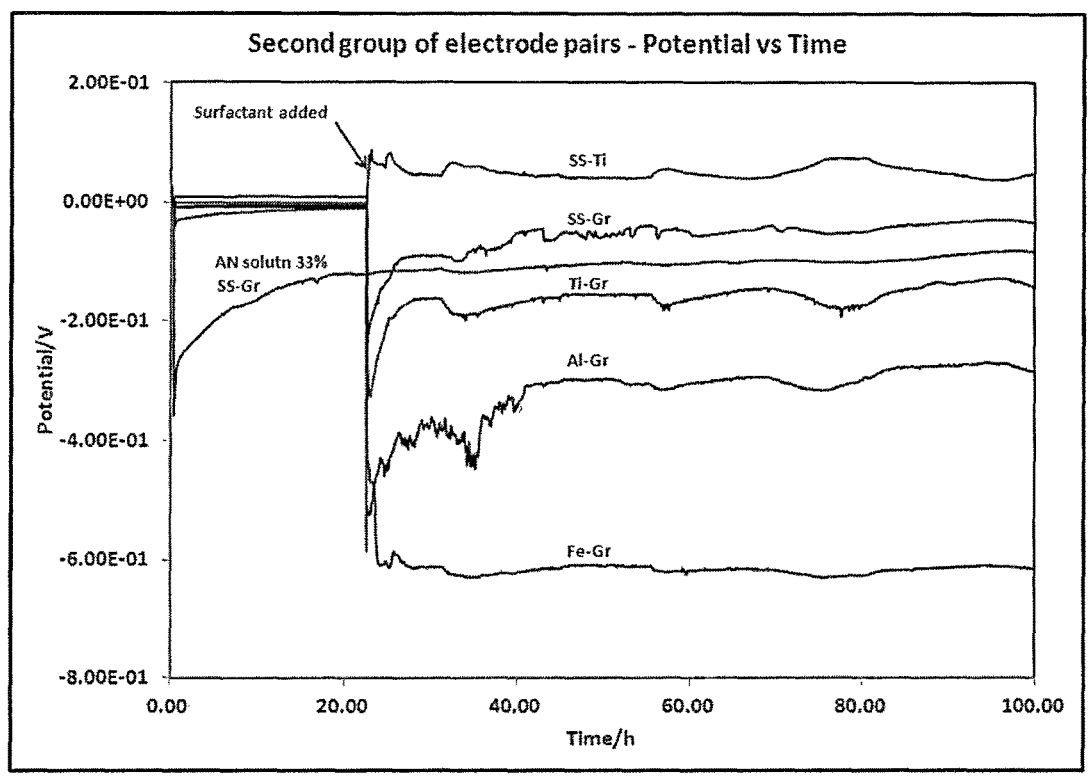
FIG. 6 is a plot of Voltage-time data recorded for six different galvanic couples, as referred to in the examples.

Plots of the data recovered from all twelve galvanic couples are shown in FIGS. 5 and 6. In these figures TS=Tool Steel, type A2, SS=Stainless Steel; Gr=Graphite, AN sol 33%=aqueous solution of ammonium nitrate 33% w/w. In each experiment, five couples were immersed in the emulsion, and one couple was immersed in a 33% w/w aqueous solution of ammonium nitrate for comparison. In all cases, the conductor listed first in the pair was connected to the positive terminal of the data logger.

Experiment 01

Experiment 01 used Ni—Ti, Al—Ni, Al—Ti, Al-TS and Fe—Ti immersed in the emulsion, and Al-TS immersed in the 33% ammonium nitrate solution. The experiment was allowed to run for approximately 47 h before the surfactant was added, to test whether any of the couples would begin to generate a voltage from the unaltered emulsion. None did to any significant degree. However, upon adding the surfactant, the effect was immediate. All couples showed a strong response. The Al—Ti couple recorded a voltage of almost −0.6 V initially, but then began to passivate and continued to do so throughout the next 80 h. A similar, but smaller, response was measured for the Al—Ni couple. In contrast, Fe—Ti and Ni—Ti showed a slower initial increase in voltage, but their responses persisted or increased with time, with the Fe-Ti couple reaching −0.4 V after 80 h. The Al-TS pair was unusual, in that it increased immediately to about +0.3 V and stayed close this potential thereafter. In contrast, the couple immersed in the ammonium nitrate solution behaved erratically: a common response when electrochemical reaction rates are low. The reason this couple to behaved differently compared with the identical couple immersed in the emulsion is not clear.

Experiment 02

The main reason for running a second experiment was to test the effectiveness of Gr as an electrode material. The electrode pairs used were SS-Gr, Ti-Gr, Al-Gr, Fe-Gr and SS-Ti in the emulsion, and SS-Gr in the 33% ammonium nitrate solution. Again, none of the electrode pairs generated significant voltages until the surfactant was added. Only Al-Gr and Fe-Gr generated a voltage whose absolute value was greater than 0.2 V 24 h after the addition. Furthermore, the Ai-Gr couple showed a slow passivation of its response, reaching −0.27 V after 147 h. In contrast, the Fe-Gr couple maintained −0.6 V or greater throughout the entire experiment, a most pleasing result and the best of any of the couples in either experiment. In this experiment, the couple immersed in the ammonium nitrate solution behaved more predictably and gave a similar response to the same couple immersed in the emulsion: a sharp initial rise followed by a slow decay.

Figure 7:
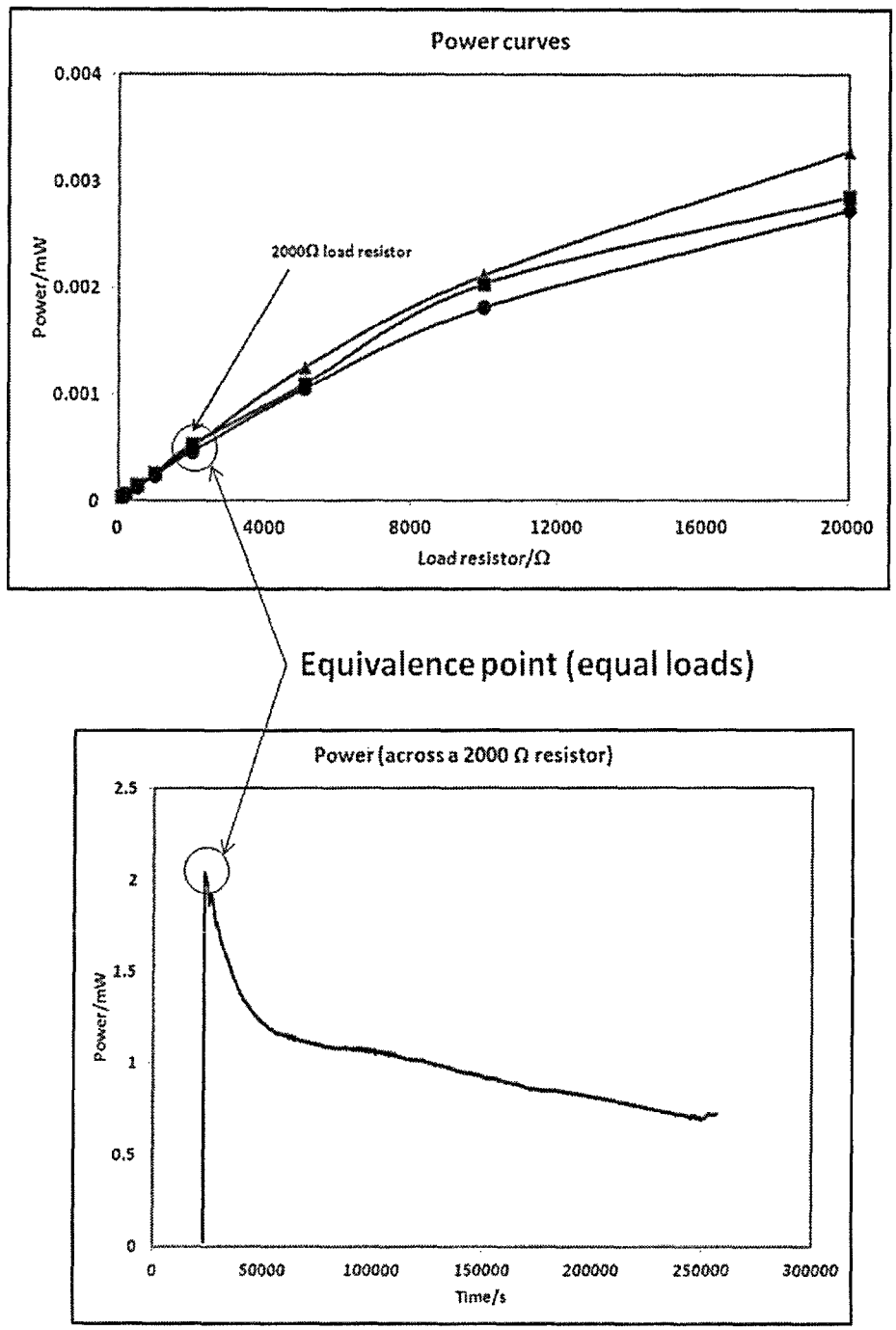
FIG. 7 is a plot illustrating power output increase by increasing electrode surface area; as referred to in the examples.

Data from this study has identified that the low-surface area of the graphite electrode limits the power available. Preliminary trials to replace the graphite with high surface-area activated carbon has significantly increased power output to levels relevant to foreshadowed applications, FIG. 7 below demonstrates this effect. In relation to this figure the top panel shows the power-response curves of rod-shaped Iron-Graphite electrode pairs. In the lower panel, the graphite is replaced with high surface-area activated carbon. The circles are drawn at the equivalent resistor levels and demonstrate a very significant increase in power output.

Time-Lapse Photography of Emulsion Breakdown

Figure 8:
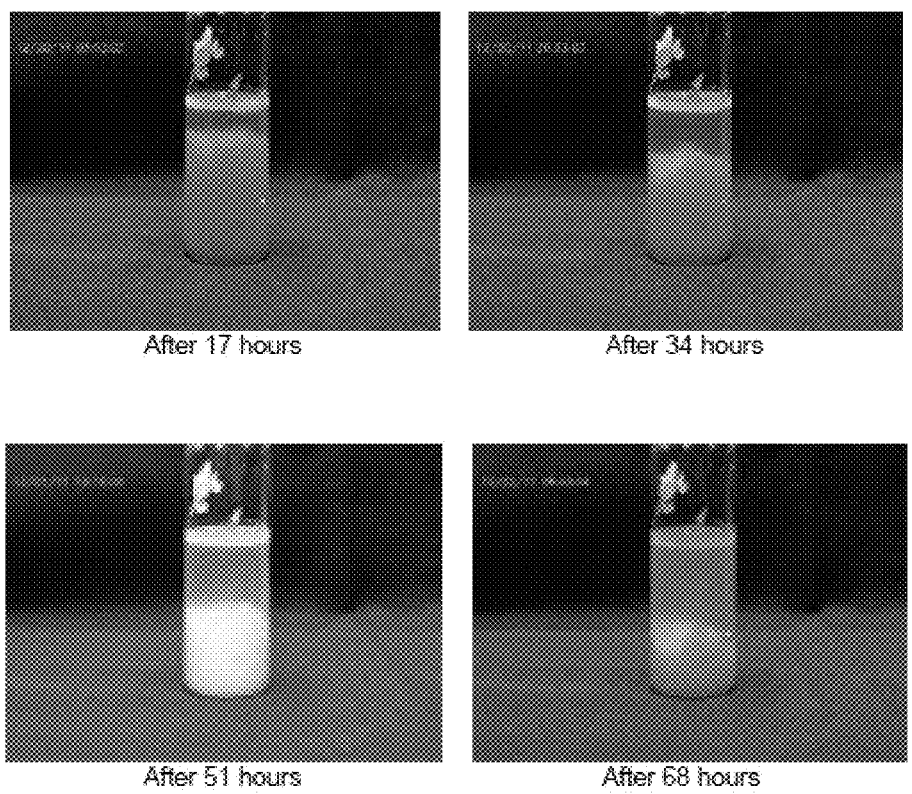
FIG. 8 is a series of images from a time-lapse series taken showing the breakdown of an emulsion after the addition of demulsifier, as referred to in the examples.

The addition of surfactant (3% w/w sodium alkylnaphthylenesulfonate (Petro® AG) had an immediate impact on the voltage recorded on all of the galvanic couples tested. However, the visible changes produced to the emulsion were far slower, so time-lapse photography to was used to measure the speed at which the emulsion broke down. The same experimental conditions as for the voltage measurements were used for this experiment and the images recorded show the emulsion takes between 3 and 4 days to completely break down. Four selected images from entire sequence of images captured are reproduced in FIG. 8.

Discussion

The voltage responses recorded on four galvanic couples Fe-Gr, Al-Gr, Fe—Ti and Al-TS—indicate these couples may offer the possibility of generating energy from ammonium nitrate emulsions, as long as the emulsion is broken.

While these results are encouraging, they do not indicate how much energy these galvanic couples might provide. Kinetics factors, such as diffusion of reactants and/or products, precipitation of insoluble materials and adsorption of passive compounds, could all play a role in limiting energy production in an emulsion. The measurement of energy production from cells designed to optimise their electrochemical activities would be desirable.

It was noted that the rate at which the emulsion broke down in the experimental arrangement used for the voltage measurements has a similar time constant to the decay rates exhibited by some of the voltage-time curves. On this basis, it is tempting to equate the two processes, but such an interpretation may be overly simplistic. If fresh electrode surface is constantly being exposed during emulsion breakdown, then a more constant voltage-time curve would be expected. However, if passivation processes do take place within the emulsion, then slow breakdown could also be desirable for sustaining energy generation.

The small periodic variation in all traces most likely results from daily temperature fluctuations in the laboratory. The large spike at 120 h in the Fe-Gr couple was a deliberate disconnection.

Conclusions

A method for generating electrical energy from a proprietary nitrate sulphate-containing water-in-oil emulsion using galvanic couples has been identified. The initial tests show that three couples—iron-titanium, aluminium-tool steel and iron-graphite—can generate a significant voltage at close to open circuit conditions, but only once the emulsion has been 'broken' by the addition of a suitable surfactant. The intact emulsion effectively blocks ionic transport between the galvanic couples and hence, inhibits all electrochemical activity. This could be a positive asset, as it may provide an effective chemical switch for the energy generation process. The responses of the galvanic couples to the addition of surfactant were immediate, although time-lapse photography showed the emulsion takes three to four days to completely break down. This slow rate of degradation may help provide sustained power generation.

The results of the tests described in this report are considered sufficient to plan the next stage of the project.

EXAMPLE 4

In another exemplification the positive electrode is constructed from activated carbon and the negative electrode from zinc. Individual cells can be stacked together to boost the overall voltage and many different forms of the cell stack can be envisaged. Two examples demonstrate the utility of this exemplification.

EXAMPLE 4(a)

Electrodes are constructed from zinc plate and activated carbon with dimensions of 100 mm×110mm. A cell stack is formed by arranging two unipolar electrodes at each end of the stack and the desired number of bipolar electrodes within the stack. The electrode arrangement is thus:

(positive) AC|Zn-AC|Zn-AC|Zn-AC . . . |Zn-AC|Zn (negative)

where Zn-AC denotes a bipolar electrode and the vertical line indicates a cell space to be filled by solution. The dashed line represents an electrical connection.

Figure 9:
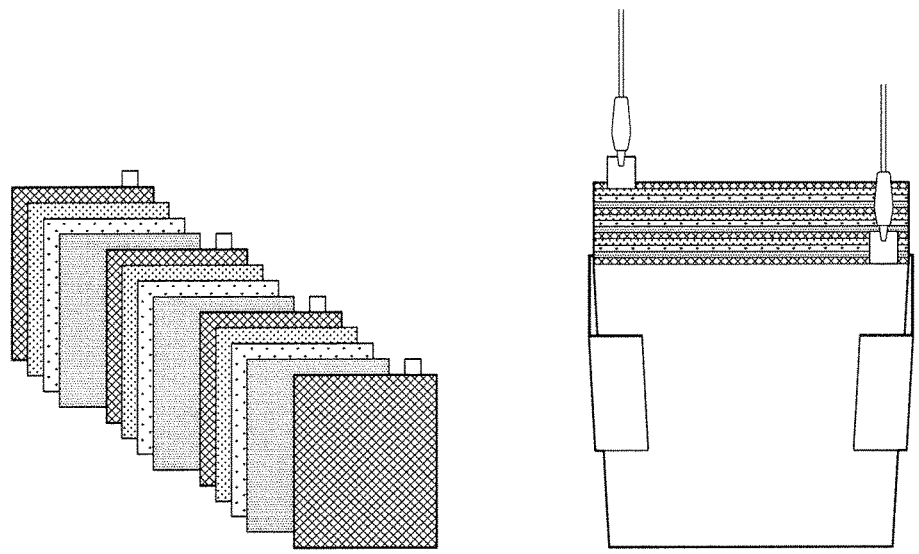
FIGS. 9 and 10 are photographs illustrating experimental arrangements employed in Example 4(a) and 4(b).
Figure 10:
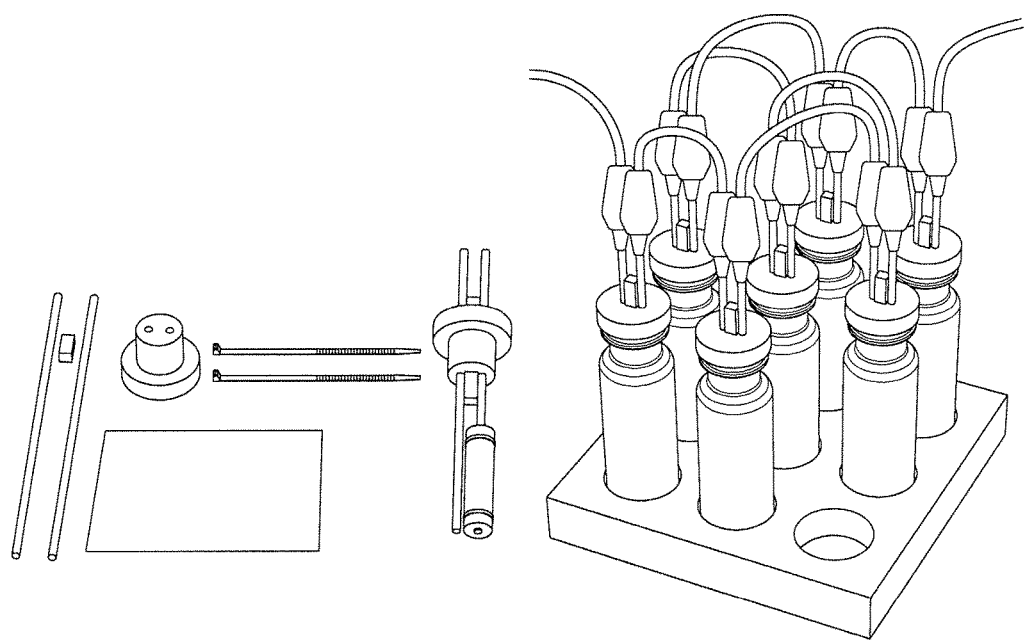

The unipolar electrodes are a zinc sheet and a rectangle of activated carbon cloth attached to a rigid PVC sheet. The bipolar electrodes are an activated carbon cloth attached to the insulated back of a zinc sheet. Electrical contact is made between the activated carbon cloth and the zinc sheet using electrically-conductive, adhesive copper tape. These electrodes form the body of the stack and the cell void is defined by a 3 mm thick nitrile rubber gasket cut so as to seal the sides and base of cell. The stack is clamped together firmly to seal the individual cells which are filled with emulsion during assembly (FIG. 9 below). In relation to FIG. 9 this illustrates a three-cell stack showing the individual components (left) and when fully assembled (right).

EXAMPLE 4(b)

Individual cells are made from glass vials of the desired size. Electrodes are made from zinc spray wire (2.5 mm diameter×90 mm) and activated carbon cloth (40 mm×80 mm) wrapped around an inert current collector (titanium or stainless steel rod, 3 mm diameter×90 mm). This electrode assembly is clamped firmly in position and individual cells are connected electrically thus:

The invention claimed is:

1. A method of conducting a commercial blasting operation in which electricity required for operation of a device employed in the operation is generated by forming a galvanic cell comprising two electrodes in contact with an ionic conductor, wherein
    (i) the ionic conductor is an explosive composition being used in the commercial blasting operation or derived from an explosive composition being used in the commercial blasting operation,
    (ii) the explosive composition is an emulsion explosive comprising droplets comprising an electrolyte in a matrix of a fuel phase, and
    (iii) a demulsifier is contacted with emulsion explosive between the electrodes in order to produce an ionic conductor between the electrodes.

2. The method of claim 1, wherein the electricity that is generated is used as a source of energy to power an electric or electronic detonator to control operation thereof.

3. The method of claim 1, wherein the electricity that is generated is used as a source of electrical energy to power wireless communication between a device and a blast controller.

4. An electrical device for use in a commercial blasting operation, wherein the device comprises two electrodes and wherein electricity for powering the device is generated by forming a galvanic cell comprising the two electrodes in contact with an ionic conductor, wherein
    (i) the ionic conductor is an explosive composition being used in the commercial blasting operation or derived from an explosive composition being used in the commercial blasting operation,
    (ii) the explosive composition is an emulsion explosive comprising droplets comprising an electrolyte in a matrix of a fuel phase, and
    (iii) a demulsifier is contacted with emulsion explosive between the electrodes in order to produce an ionic conductor between the electrodes.

5. A device according to claim 4, wherein the device is an electric or electronic detonator or a wireless electronic booster or other device intended to initiate an explosive.

6. A device according to claim 4, wherein the electricity that is generated is used as a source of electrical energy to power wireless communication between the device and a blast controller.

7. A device according to claim 4, wherein the electricity that is generated is used as a source of electrical energy to power the firing and/or firing control circuits of the electrical device.

8. The method of claim 1, wherein the ionic conductor is an explosive composition has a conductivity of at least 0.1 $Sm^{-1}$.

9. The method of claim 1, wherein the explosive composition is doped with an additive in order to increase the electrical conductivity of the explosive composition.

10. The method of claim 1, wherein the explosive composition is caused to undergo a physical or chemical transformation in order to increase its electrical conductivity and provide the ionic conductor.

11. The method of claim 1, wherein the explosive composition comprises ammonium nitrate prill and the ionic conductor is formed by dissolution of ammonium nitrate of the prill in a solvent.

12. The method of claim 1, wherein electricity is generated at a current of from 0.1 mA to 10 mA and at a voltage of from 1 V to 5V.

13. The method of claim 1, wherein the explosive composition is contained in a booster shell.

14. The method of claim 1, wherein the explosive composition is a bulk explosive loaded in a blast hole.

15. The method of claim 1, wherein the demulsifier is provided as a coating on one or both electrodes.

16. The method of claim 1, wherein one or both electrodes are coated with a passivating material that is gradually consumed on contact with the ionic conductor.

17. The device of claim 4, wherein the demulsifier is provided as a coating on one or both electrodes.

18. The device of claim 4, wherein one or both electrodes are coated with a passivating material that is gradually consumed on contact with the ionic conductor.

19. The device of claim 4, wherein the electrodes are mounted on a housing that is adapted to allow the electrodes to be immersed in an explosive composition during use of the device.

20. The device of claim 4, wherein the housing is structured to be connected or fitted to a contained explosive charge.

21. The device of claim 4, wherein the housing is structured to be connected or fitted to a booster shell.

22. The device of claim 4, further comprising a built-in power source that supplies sufficient electrical energy to power required functionality of the device but that is not directly related to or not sufficient to cause initiation of the device.

* * * * *